United States Patent Office 3,185,217
Patented May 25, 1965

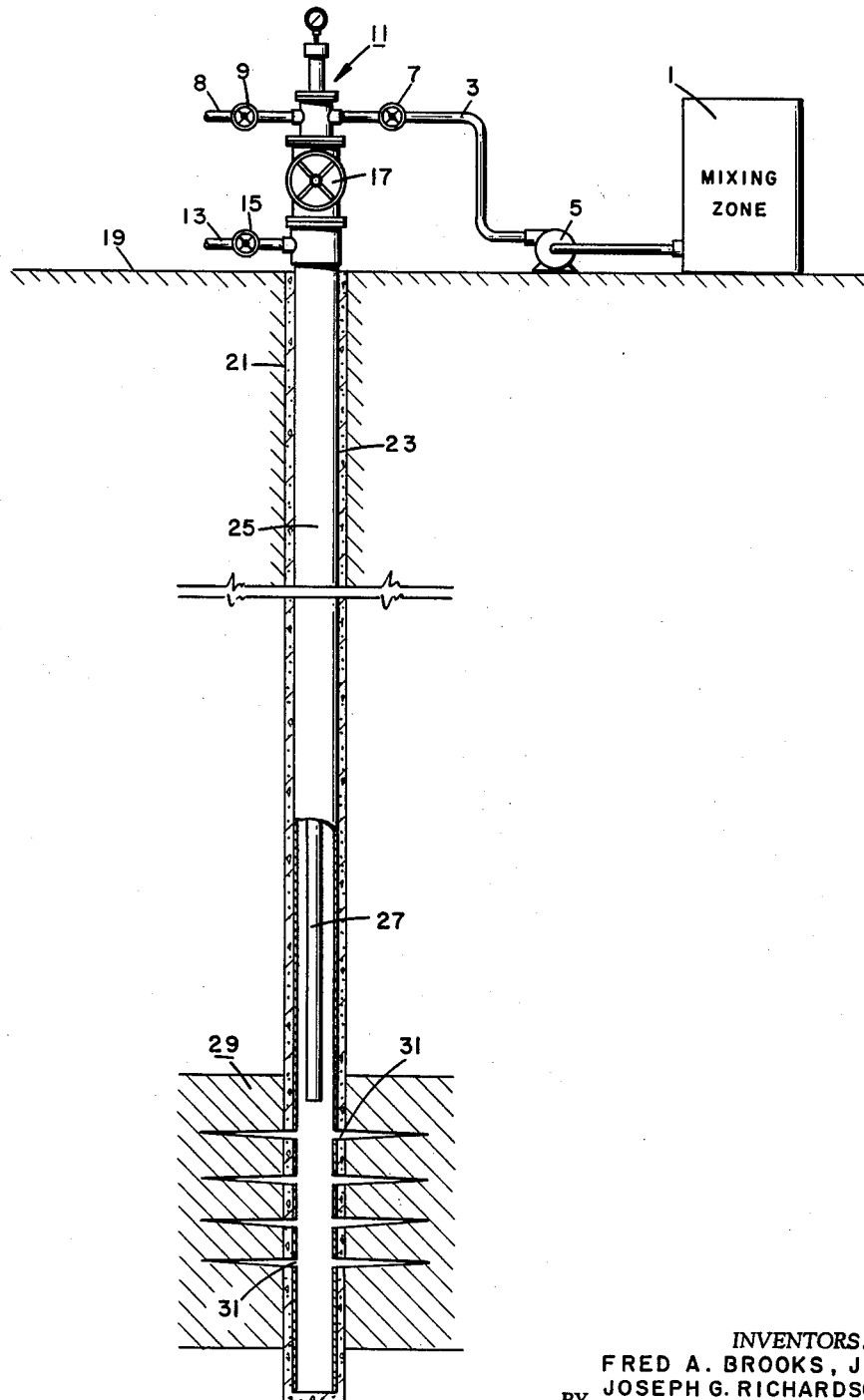

3,185,217
WELL TREATMENT TO REMOVE PERMEABILITY BLOCK
Fred A. Brooks, Jr., and Joseph G. Richardson, Houston, Tex., assignors, by mesne assignments, to Esso Production Research Company, Houston, Tex., a corporation of Delaware
Filed May 20, 1963, Ser. No. 281,692
6 Claims. (Cl. 166—42)

This invention relates to the production of hydrocarbons from a productive subsurface earth formation. More particularly, the invention relates to well treatment for stimulating production from wells wherein production either has decreased or has stopped altogether as a result of the formation of an emulsion block around the well bore.

During the productive life of an oil or gas well, often it is observed that the production of hydrocarbons from a particular earth formation will diminish either suddenly or gradually and, in some cases, may cease altogether. In many situations of this nature, it is believed that the reduction in hydrocarbon production is brought about by a so-called emulsion block wherein a viscous emulsion of oil and water is formed around the well bore through which neither connate water nor oil can penetrate. The formation of such emulsion blocks may be aided by surfactants naturally present in the earth formation materials and/or contained liquids. Such surfactants may also form from reaction of introduced materials with formation materials. In the past it has been the practice to break such emulsions by injecting into the formation through the well bore corrective surfactants in solution with a carrier such as crude oil, diesel oil, or water. While such corrective measures have achieved satisfactory results in many instances, the performance of a significant percentage of emulsion-blocked wells has not been significantly improved by injection thereinto of surfactants in a relatively nonviscous carrier such as oil or water. Usually, fluid can be pumped without difficulty into the formation even though the well will not produce after the formation has been treated. It has been observed that such one-way blockage is characteristic of the presence of a native emulsion. When this phenomenon (one-way blockage) is observed, treatment by the method of this invention is particularly effective. It is thought that failure of prior art treatments is a consequence of fingering of the treating fluid through the blocking emulsion, with resulting nonuniform contact of the formation by the treating fluid. The fingering tendency is more pronounced in relatively nonhomogeneous formations. It has also been observed that most of the emulsions are water-in-oil, that the formation of such emulsion can be triggered by some introduced fluid such as cement filtrate or water used to kill the well during a workover operation, and that the emulsions are stabilized in part by fine solids naturally present in the formation.

In accordance with the teachings of the present invention, the treating surfactants are carried into the formation by means of a viscous oil-in-water emulsion. The treating surfactants are of the type which promote the formation of oil-in-water emulsion and which precipitate from the emulsion at a temperature slightly lower than the temperature of the productive earth formation to be treated, causing the treating emulsion to break. When the solution is injected through a well bore into the earth formation, the native emulsion causing the emulsion block is forced away from the well bore. As a result of the viscous nature of the oil-in-water emulsion, there is no fingering thereof through the native emulsion. When the injected emulsion has risen in temperature to near the temperature of the formation, it reverts to two low viscosity fluid phases and the surfactants therein are deposited on the earth formation particles. This low viscosity fluid is thereupon produced from the formation. As the water-in-oil emulsion gradually returns to the portion of the formation around the well bore, the surfactant breaks the native emulsion, and the low viscosity oil and water are produced through the borehole.

Further in accordance with the teachings of the present invention, the injected emulsion is formed by mixing a nonionic, water-soluble surfactant and an anionic surfactant with between 1 and 8 volumes of oil to each volume of water. The cloud point temperature range of the nonionic surfactant is selected to be from 0 to 20° F. lower than the temperature of the formation to be treated. The amount of both the nonionic surfactant and the anionic surfactant is from .25 to 4 vol. percent relative to the volume of the water in the emulsion. A film strengthening agent in the amount of 0 to 4% by weight of water may be added.

Objects and features of the invention which are not apparent from the above discussion will become evident upon consideration of the following detailed description of the invention taken in connection with the accompanying drawing wherein the single figure represents in schematic form an oil well installation wherein the invention is utilized.

With reference now to the drawing, there is shown a borehole 21 extending from the earth's surface 19 to a hydrocarbon productive earth formation 29. Suspended in the borehole from a well head apparatus 11 is a casing string 25 which is bonded to the sides of the borehole 21 by means of a cement sheath 23. The casing string is illustrated as having been perforated at the level of the formation 29 so as to provide performations 31 for fluid communication between earth formation 29 and the bore of the casing string 25. Coextending with the casing string 25 from the earth's surface 19 is a flow tubing string 27 through which produced fluids are drawn to the earth's surface and formation treating fluids are injected into the well bore. The well head apparatus 11 is provided with a line 13 controlled by valve 15 opening into the annulus between the casing string 25 and tubing string 27, a main valve 17, a line 8 controlled by valve 9 through which produced fluids are flowed to collection tanks, and a line 3 controlled by valve 7 through which treating fluids are injected into the flow tubing string 27.

Let it be assumed that the earth formation 29 is of a relatively nonhomogeneous nature and contains a native water-in-oil emulsion that serves to block the flow of connate earth fluids into the well bore. At some time prior to the initiation of stimulation operations, the temperature of the formation is measured by any of a number of techniques well known in the prior art. Preparatory to stimulation operations, valve 9 is closed and valves 7, 15, and 17 are opened. If the flow tubing 27 and the casing-tubing annulus are not filled with liquid, a clear liquid such as salt water or oil is circulated down the tubing 27 and the tubing-casing annulus until both the tubing and casing are filled with liquid. In mixing zone 1 there is mixed a treating emulsion comprising a given quantity of aqueous phase, from 1 to 8 volumes of an oil such as diesel fuel or kerosene, from .25% to 4% by volume of an anionic surfactant, from .25% to 4% by volume of a nonionic surfactant, and from 0 to 4% by weight of a film strengthening agent. The aqueous phase may be fresh water or saline solution. The anionic surfactant preferably is of the sodium alkyl sulfate type having a chain (either straight or branched) length of 8 to 16 carbon atoms. Other anionic surfactants having calcium and salinity tolerance, such as salts of alkane sulfonic acids and salts of alkyl aromatic sulfonic acids, may be used. Examples of specific anionic surfactants that are suitable for use with the invention are the following: sodium tetradecyl sulfate, sodium heptadecyl sulfate, sodium di(2-ethylhexyl) phosphate, sodium 2-ethylhexyl sulfate, sodium dioctyl sulfosuccinate, sodium dihexyl sulfosuccinate, sodium diamyl sulfosuccinate, N-octadecyl disodium sulfosuccinate, sodium isopropyl naphthalene sulfonate, sodium alkyl aryl polyether sulfate, sodium alkyl aryl sulfonates, and alkyl ester of ethylene sulfite-sodium salt.

Suitable nonionic emulsifiers are nonionic surfactants which are alcohols, esters, and substituted ethers. Specific nonionic surfactants that are suitable for use are the following: nonyl phenol ethylene oxide, trimethyl nonanol ethylene oxide, polyalkylene glycol ether, alkyl aryl polyether alcohol, polyoxyethylene, polyoxypropylene, alkyl phenoxy ethyleneoxide ethanol where the alkyl is $C_8$ or higher, polyoxyethylene sorbitan monolaurate, polyoxyethylene sorbitan monopalmitate, polyoxyethylene sorbitan monostearate, polyoxyethylene sorbitan monoleate, polyoxyethylene lauryl ether, polyoxyethylene oleyl ether, polyoxyethylene stearate, and polyoxyethylene palmitate. The thermal stability of the treating emulsion is critical, and the cloud point temperature of the nonionic surfactant must be lower than and within 10 degrees of the temperature of the formation to be treated. It is preferable that the nonionic surfactant should have a cloud point temperature as close as possible to the specific formation temperature. For the purpose of the present invention, the term "cloud point temperature range" is defined as the temperature range at which the nonionic surfactant begins to indicate insolubility from an aqueous solution of given concentration (usually 1% by weight of surfactant) as the solution temperature is increased.

The salinity of the water used in formation of the treating emulsion should be between 0 and 15%. Preferably, the salinity should be 6% (expressed as weight percent of NaCl).

The film strengthening agents may comprise a high molecular weight polymer of condensation product of sulfonated phenol formaldehyde, sodium carboxymethyl cellulose, guar flour, sodium lignosulfonate, ferrochrome lignosulfonate and chrome lignosulfonate, and calcium lignosulfonate.

The percentage weights and volumes of all of the above ingredients of the treating emulsion are relative to the volume or weight of water used in the emulsion.

As indicated above, the emulsion is mixed in mixing zone 1. The volume of the emulsion produced in mixing zone 1 is sufficient to occupy the earth formation at least throughout the zone calculated to be occupied by the native blocking emulsion. After the treating emulsion has been formed it is pumped through line 3 by means of pump 5 down the flow tubing 7 to the level of earth formation 29. When it has been calculated that the front of the treating emulsion has reached the level of the earth formation 29, valve 15 is closed. The pressure produced by pump 5 is thereupon increased so as to force the treating emulsion through perforations 31 into the earth formation 29.

When a volume of the treating emulsion sufficient to occupy the zone previously occupied by the native emulsion has been injected into the earth formation, the pump 5 is stopped and the valves 7 and 17 are closed. The treating emulsion is allowed to incubate in the earth formation for a period of at least two hours until the temperature of the treating emulsion has risen to a temperature at which the emulsion reverts to low viscosity fluids. The surfactants therein precipitate on to the earth formation particles. The valves 9 and 17 are thereupon opened and the low viscosity fluids are produced to the earth's surface. The native emulsion will gradually re-enter the zone of formation 29 from which it was forced, and as it enters this zone it will break as a result of the reaction with the surfactants precipitated on to the earth formation particles of the zone. The resulting oil and water then can be produced to the earth's surface.

A well on the Texas Gulf Coast produced its discovery allowable of 140 barrels a day for a period of time. Mechanical difficulties necessitated remedial work; at the conclusion of the remedial operations the production was about 5 barrels per day. Wells completed in the same formation in the same field that had evidenced similar symptoms had been treated with surfactants using conventional techniques. Most of such treatments had been unsuccessful in restoring production. Conventional techniques had not been successful in restoring productivity to this particular well. Seventy-two barrels of a treating emulsion having the following composition was prepared.

One volume 6% aqueous NaCl solution
2% (by vol. of aqueous) Tergitol Anionic 4 (sodium tetradecyl sulfate)
2% (by vol. of aqueous) Tergitol Nonionic NPX (nonyl phenol ethylene oxide)
2% (by wt. of aqueous) calcium lignosulphonate (Kembreak)
Six volumes diesel fuel This emulsion was pumped into the formation without difficulty. After placement of the emulsion, the well was shut-in for a period of 36 hours. When the well was again placed on production, it was found possible to produce 90 to 100 barrels per day therefrom. The well has since been producing its full allowable of 30 barrels per day without difficulty.

It is to be noted that the preferred emulsion utilizes both anionic and nonionic surfactants. It has been found that the thermal stability of the emulsion seems to depend upon the use of both types of surfactants; the combination of surfactants appears to be more effective than either when used alone. The specific emulsion utilized in the field test described above has a viscosity of approximately 1000 cps. It has been found that the emulsion is completely stable on standing at room temperature for periods in excess of three weeks. However, when the temperature of the emulsion is raised to the cloud point temperature of the nonionic surfactant, the emulsion quickly reverts to a low viscosity system. It has also been found that when the combination of surfactants is used, the earth particles subjected to treatment with the emulsion are almost totally water-wet as compared to the partially water wetness that results in stabilization of blocking, native emulsions.

The above description and examples of the invention are for the purpose of illustration, and it is not intended that the invention be limited except by the scope of the appended claims.

What is claimed is:

1. The method of restoring production of earth formation fluids through a well bore penetrating a hydrocarbon productive earth formation blocked by a water and oil emulsion surrounding a borehole, comprising:

admixing a quantity of water with 1 to 8 volumes of oil per volume of water, from .25 vol. percent to 5 vol. percent of an anionic surfactant, from .25 vol. percent to 5 vol. percent of a nonionic surfactant having a cloud point temperature less than and within 10 degrees of the temperature of the earth formation, and 0 to 4 weight percent of a film strengthening agent to form a viscous oil-in-water emulsion;

injecting the oil-in-water emulsion into the formation;
   incubating the emulsion in the formation until the emulsion reverts to a low viscosity fluid; and
   producing the resulting low viscosity fluid from the well to subject the native emulsion to the action of surfactant from the oil-in-water emulsion remaining in the formation.

2. The method of restoring production of earth formation fluids through a well bore penetrating a hydrocarbon productive earth formation blocked by a water and oil emulsion surrounding a borehole, comprising:

measuring the temperature of the earth formation;
   admixing a quantity of water with 1 to 8 volumes of petroleum oil per volume of water, from .25 vol. percent to 5 vol. percent of an anionic surfactant, from .25 vol. percent to 5 vol. percent of a nonionic surfactant having a cloud point temperature less than and within 10 degrees of the temperature of the earth formation, and 0 to 4 weight percent of a film strenthening agent to form a viscous oil-in-water emulsion;

injecting the oil-in-water emulsion into the formation;

incubating the emulsion in the formation for at least 2 hours until the emulsion reverts to a low viscosity fluid; and producing the resulting low viscosity fluid from the well to subject the native emulsion to the action of surfactant from the oil-in-water emulsion remaining in the formation.

3. The method of claim 2 wherein the nonionic surfactant is a substituted ether and the anionic surfactant is selected from the group consisting of salts of alkane sulfonic acids, salts of alkyl aromatic sulfonic acids, alkyl sulfates, and mixtures thereof.

4. The method of claim 3 wherein is used about 2 vol. percent of the nonionic surfactant, about 2 vol. percent of the anionic surfactant, and 6 vols. of oil per volume of water.

5. The method of restoring production of earth formation fluids through a well bore penetrating a hydrocarbon productive earth formation blocked by a water and oil emulsion surrounding a borehole, comprising:

admixing a quantity of water with 1 to 8 volumes of petroleum oil per volume of water, from .25 vol. percent to 5 vol. percent of an anionic surfactant, from .25 vol. percent to 5 vol. percent of a nonionic surfactant having a cloud point temperature less than and within 10 degrees of the temperature of the earth formation, and 0 to 4 weight percent of a film strengthening agent to form a viscous oil-in-water emulsion;

measuring the cloud point temperature of the nonionic surfactant;

injecting the oil-in-water emulsion into a formation having a formation temperature no more than 10 degrees above the cloud point temperature of the nonionic surfactant;

incubating the emulsion in the formation for at least 2 hours until the emulsion reverts to a low viscosity fluid; and producing the resulting low viscosity fluid from the well to subject the native emulsion to the action of surfactant from the oil-in-water emulsion remaining in the formation.

6. The method of claim 5 wherein the nonionic surfactant is a substituted ether and the anionic surfactant is selected from the group consisting of salts of alkane sulfonic acids, salts of alkyl aromatic sulfonic acids, alkyl sulfates, and mixtures thereof.

References Cited by the Examiner

UNITED STATES PATENTS 2,945,818  7/60  Costine et al. _____ 252—353

CHARLES E. O'CONNELL, *Primary Examiner.*